United States Patent [19]

Neuhaus et al.

[11] Patent Number: 4,594,571

[45] Date of Patent: Jun. 10, 1986

[54] MULTIPLEX CABLING SYSTEM FOR VEHICLES

[75] Inventors: Detlev Neuhaus, Langenhagen; Karl-Heinz Hesse, Gehrden; Gerhard Ruhnau, Neustadt; Peter Liermann, Barsinghausen, all of Fed. Rep. of Germany

[73] Assignee: WABCO Fahrzeugbremsen GmbH, Hanover, Fed. Rep. of Germany

[21] Appl. No.: 448,532

[22] Filed: Dec. 10, 1982

[30] Foreign Application Priority Data

Dec. 11, 1981 [DE] Fed. Rep. of Germany ....... 3149142

[51] Int. Cl.⁴ .............................................. B60Q 1/00
[52] U.S. Cl. ................................ 340/52 F; 307/10 R; 307/10 LS
[58] Field of Search ............ 340/52 F, 825.44, 825.49, 340/825.52, 825.07–825.17, 0.16, 0.22, 508; 307/10 R, 10 LS, 38; 370/58, 77, 16; 315/82, 83; 455/8

[56] References Cited

U.S. PATENT DOCUMENTS 3,651,454  3/1972  Venema et al. .................. 340/52 F
3,952,286  4/1976  Wakamatsu et al. .......... 340/825.07
4,028,495  6/1977  Funamo et al. ...................... 370/58
4,156,151  5/1979  Borroni ............................ 307/10 R
4,302,841  11/1981 McCulloch ..................... 307/10 R
4,376,909  3/1983  Tagami et al. ................. 307/10 LS
4,463,341  7/1984  Iwasaki ............................ 340/52 F Primary Examiner—John W. Caldwell, Sr.
Assistant Examiner—Tyrone Queen
Attorney, Agent, or Firm—J. B. Sotak

[57] ABSTRACT

A multiplex cabling system for controlling electrical apparatus on motor vehicles, which consists of a central transmitter and several area transmitter-receivers, each connected to several controlled devices and/or indicators. Coupling between the central transmitter and the area units is made by a star-arranged line system which consists of a separate, two-wire connecting channel between the central transmitter and each area transmitter-receiver. To further increase the system's reliability and security, the central transmitter includes two microprocessors which are normally assigned to control a different pair of diagonally-opposite area transmitter-receivers. If one processor fails, the other unit assumes full system control.

5 Claims, 1 Drawing Figure

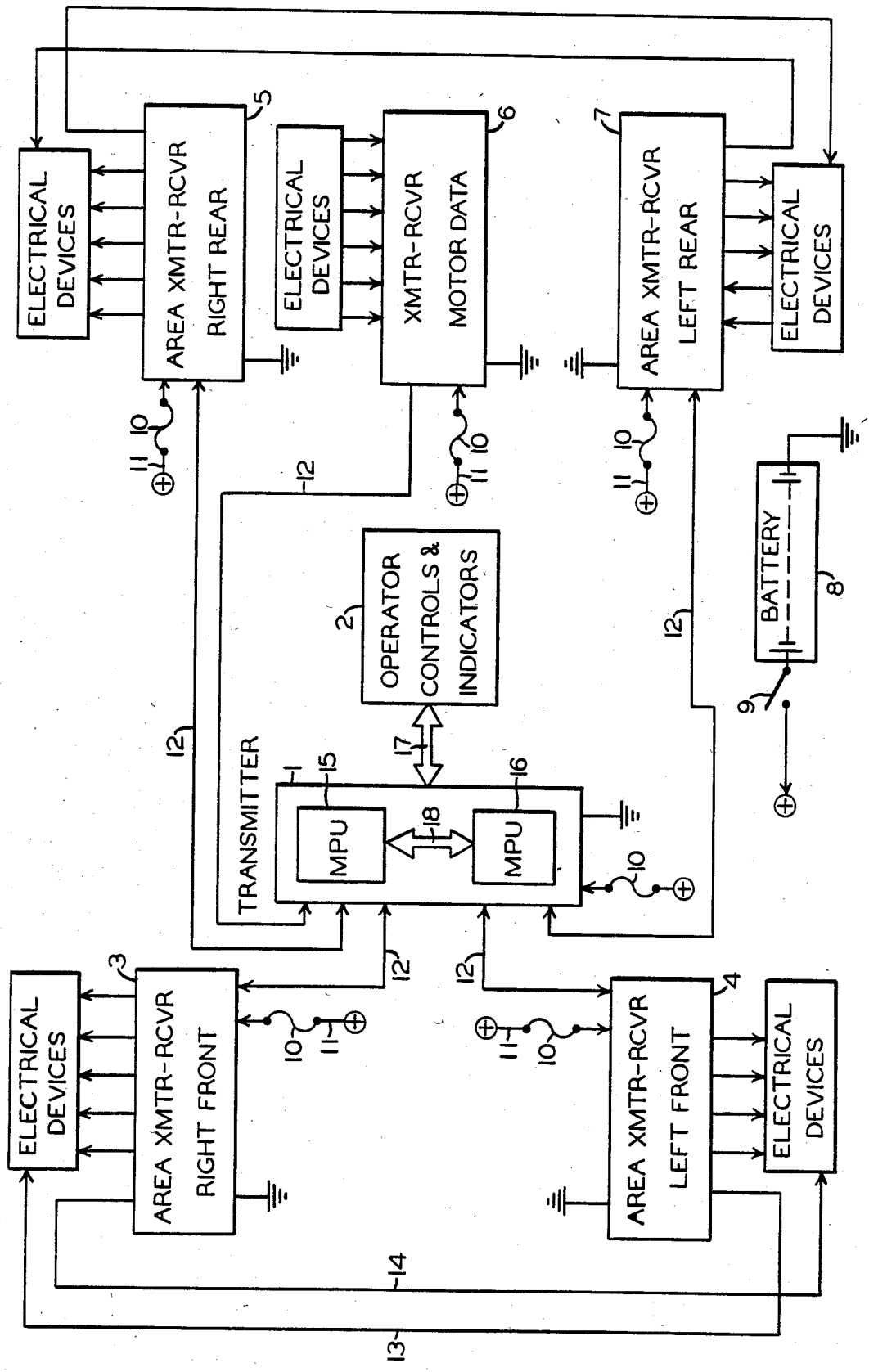

MULTIPLEX CABLING SYSTEM FOR VEHICLES

FIELD OF THE INVENTION

Our invention relates to a multiplex cabling system for vehicles. More particularly, the invention pertains to a multiplex communication cable system for transmitting commands and indications between an operator control panel and several operating devices on a highway motor vehicle.

BACKGROUND OF THE INVENTION

As a result of the constant improvement of highway vehicle equipment to increase safety and comfort, the number of electrically controlled devices in motor vehicles has increased significantly. Accompanying this trend, there has been a corresponding significant increase in vehicle cabling. In addition to the increased complexity of the wiring, the wiring harnesses have reached a size which limits their manipulation, and leads to problems with the current compact design of vehicles. In addition to the space requirement, there has also been an increase in the copper requirement and the inaccessibility of the equipment. The increasing number of lines required takes on special importance because, for reasons of mechanical strength, there is a minimum cross-section of the individual lines which must be respected, although in some cases, the measurement or control currents flow only in the milliampere range.

In order to operate with fewer lines, it is already known, e.g., U.S. Pat. No. 3,651,454 and German No. DE-OS 24,33,025, that instead of separate lines, a single multiplex ring circuit can be provided to which all of the control devices are connected by means of branch lines. This ring circuit can, for example, consist in the simplest case of one power feed and one signal line. Switching commands are applied to the signal line in coded form by means of a central transmitter. By means of receivers, which correspond to the devices, the commands are decoded and executed. The execution of the command as well as additional data concerning the actual status of the device, or other information, e.g., analog quantities, are reported back to the transmitter. It is therefore customary for the central transmitter to also receive signals, and for the location receiver to also transmit signals. In order to reduce the number of receivers, several controlled devices are connected to a common transmitter-receiver (DE-OS No. 24,33,025).

Experience has shown that the cause of problems in the electrical system of a motor vehicle is frequently to be found in the wiring, e.g., a result of short circuits or breaks. Such problems have particularly negative effects in the multiplex system with ring circuits described above. It leads not only to the failure of one controlled device, but all or a large number of them. The failure of the central transmitter has the same effect. The known multiplex systems can thus be considered overall as more sensitive to interference than conventional wiring with individual leads.

Accordingly, an object of our invention is a multiplex cabling system for vehicles with less susceptibility to interference and failure than known systems and with reliability equivalent to a direct wire arrangement.

Another object of the invention is a multiplex cabling system to control electrical devices throughout a motor vehicle with a central apparatus for transmitting command messages and receiving indication messages and area transmitter-receivers at each of selected locations to selectively receive the command messages, apply the commands to the corresponding controlled devices, and transmit indications of apparatus status and other conditions to the central apparatus.

Other objects, features, and advantages of the invention will become apparent from the following specification and appended claims when taken in connection with the accompanying drawing.

SUMMARY OF THE INVENTION

In practicing the invention, we use a so-called star-arranged communication network from the central control transmitter to the area transmitter-receivers at selected locations throughout the motor vehicle where several controlled devices are positioned. As specifically disclosed, a separate two-wire circuit or channel extends from the central transmitter to each remote transmitter-receiver location. One wire provides power for all the apparatus at that location while the other wire carries the coded messages, with returns through a common vehicle ground. The central transmitter is coupled to receive commands from the operator through his control panel which also includes indicators to register the status of controlled devices and other operating conditions. The central transmitter apparatus thus also acts as a receiver of indications from all locations. This central apparatus includes duplicate data processing units to process the panel. Each unit is preferably a well known microprocessor operator commands into selective messages for transmission to the area receivers and to transform received indication messages into proper form for selective registry on the panel. Each unit is preferably a well known microprocessor circuit element. Normally each processor handles transmission and reception to and from one pair of area transmitter-receivers at two diagonally opposite corners of the vehicle. However, if either processor fails, the full operation is transferred to the remaining active unit. Although slightly more wire cabling is required than with a loop multiplex communication channel, the star-arranged network provides greater reliability and security. If a single channel from the central transmitter to a particular area transmitter-receiver is interrupted or short-circuits, only that transmitter-receiver becomes inactive. All other channels and corresponding transmitter-receivers continue to function so that the vehicle can operate with reasonable effectiveness. The processors may even shift certain important control functions through cross-connections from other areas.

BRIEF DESCRIPTION OF THE DRAWING

Before defining the invention in the appended claims, we will describe a specific arrangement of apparatus embodying the invention, as illustrated in the single drawing FIGURE which is a block circuit diagram of the multiplex cabling system for a motor vehicle.

DESCRIPTION OF THE ILLUSTRATED EMBODIMENT

Referring to the drawing, the system essentially consists of a central transmitter 1, which is connected with area distributors, shown as transmitter-receiver units 3 to 7, by means of separate communication channels in a so-called star-arranged network. Each channel consists of connecting lines 11 and 12 which may be in twin-wire cables. The one line 11 in each cable carries the current supply to the area distributors. The latter are connected by fuses 10 to protect the line. Each line 11 is connected to a vehicle battery 8 by means of an ignition switch 9. The second line 12 to each location serves as the signalling line. Over this line, serially-coded command messages are sent to the individual transmitter-receivers, or reply messages are returned.

The transmitter-receivers 3 to 7 are located in appropriate positions in the vehicle, where a number of electrical devices are to be found. Thus, for example, the unit 3 located at the front right-hand side in a bus, can be used for the feed to control, for example, fog headlights, right high-beam, right low-beam, right turn signal, etc. (not shown). Similiarly, the other unit distributors are also connected to the appropriate controlled devices. It is also possible to feed back the position of external sensors or analog vehicle data to the central location via the area transmitter-receivers. This capability is indicated in the transmitter-receivers 6 and 7. The unit 6 is located in the engine compartment and transmits, for example, the values for the oil temperature, the coolant temperature, the fuel supply, the brake pressure, etc. back to central transmitter 1.

For a further increase of safety, it is possible to cross-connect important devices, e.g. side-marker lights on one vehicle side, for dual control via a transmitter-receiver for the other side of the vehicle by means of transverse lines such as 13 and 14. This guarantees that, for example, even if the unit 3, which is responsible for the right side of the the vehicle, should fail, the right side-marker lights will be co-controlled by the unit 4 so that, in the dark, the outlines of the vehicle will remain lit.

The central transmitter 1 is connected by means of a bus 17 in the known way with a dashboard panel 2, on which the indicators, switches, and buttons are mounted. To increase safety, transmitter 1 consists of two computers or data processors 15 and 16, which are connected by a bus 18. The transmitter processors 15 and 16 are normally assigned to diagonally-opposite transmitter-receivers 3, 7 and 4, 5, 6, respectively. These transmitter processors 15 and 16 are preferably microprocessor elements (MPU). In case of a processor failure, its functions can be transferred from that unit to the other. This further increases the safety and reliability of the system.

Although we have herein shown and described but a single example of a multiplex cabling system for motor vehicles embodying our invention, it is to be understood that various changes and modifications therein, within the scope of the appended claims, may be made without departing from the spirit and scope of our invention.

Having now described the invention what we claim as new and desire to secure by Letters Patent, is:

1. A multiplex cabling system for a motor vehicle having a plurality of electrical devices located at selected locations which may be controlled by an operator, comprising,
   (a) a central transmitter means operable for encoding and transmitting selective command messages and receiving and decoding selective indication messages,
   (b) an operator's panel coupled to said central transmitter means for supplying selective device commands and registering received indications,
   (c) a plurality of transmitter-receivers, one at each of the selected locations on said vehicle and coupled to said central transmitter means by a star-arranged communication network, each transmitter-receiver operable for receiving and decoding selective command messages and transmitting distinctive indication messages,
   (d) a selected number of said controlled devices within an area at each selected location coupled to the corresponding transmitter-receiver to be selectively controlled in accordance with the commands initiated by the vehicle operator, and
   (e) said devices also controlling said corresponding transmitter-receiver for transmitting status indications for registry on said panel, and in which said plurality of transmitter-receivers at least includes a separate transmitter-receiver positioned in the vicinity of each corner of said vehicle coupled to said controlled devices at that location, another transmitter-receiver associated with vehicle propulsion means for transmitting operating and condition indications to said central transmitter means,
and which further includes, cross-connections from selected devices at one location to the transmitter-receiver at a second location for enabling continued control during a fault condition in the transmitter-receiver normally associated with said selected devices.

2. A multiplex cabling system as defined in claim 1 in which,
   said star-arranged communication network comprises a separate communication channel between said central transmitter means and each transmitter-receiver.

3. A multiplex cabling system as defined in claim 2 in which each separate communication channel comprises,
   (a) a first line connection for supplying operating power from a central source to said controlled devices in the associated area,
   (b) a second line connection for carrying the selective command and indication measages, and
   (c) each line connection completed through a common vehicle ground connection.

4. A multiplex cabling system as defined in claim 3 in which said central transmitter means includes,
   (a) first and second processor units,
   (b) said first processor unit is coupled to at least a first pair of transmitter-receivers for normally encoding command messages and decoding indication messages for at least the first pair of transmitter-receivers at first diagonally opposite corners of said vehicle,
   (c) said second processor unit is coupled to at least a second pair of transmitter-receivers for normally encoding command messages and decoding indication messages at least for the second pair of transmitter-receivers at the other diagonally opposite corners of said vehicle, and
   (d) said processor units cross-coupled for monitoring the operation of each respective unit and each respective unit assumes total control of system operation during a fault condition in the other respective unit.

5. A multiplex cabling system as defined in claim 4 in which,
   each of said processor units is an integrated circuit microprocessor element.

* * * * *